(12) United States Patent
Deng et al.

(10) Patent No.: US 10,712,641 B2
(45) Date of Patent: Jul. 14, 2020

(54) IMAGE PROJECTION APPARATUS

(71) Applicant: HTC Corporation, Taoyuan (TW)

(72) Inventors: Qing-Long Deng, Taoyuan (TW); Hsiu-Cheng Wang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/367,274

(22) Filed: Mar. 28, 2019

(65) Prior Publication Data

US 2019/0302585 A1 Oct. 3, 2019

Related U.S. Application Data

(60) Provisional application No. 62/648,934, filed on Mar. 28, 2018.

(51) Int. Cl.
| | |
|---|---|
| *G03B 21/14* | (2006.01) |
| *G03B 21/20* | (2006.01) |
| *H04N 9/31* | (2006.01) |
| *G02B 19/00* | (2006.01) |

(52) U.S. Cl.
CPC ....... *G03B 21/147* (2013.01); *G02B 19/0014* (2013.01); *G02B 19/0047* (2013.01); *G03B 21/208* (2013.01); *G03B 21/2066* (2013.01); *H04N 9/3152* (2013.01)

(58) Field of Classification Search
CPC ................ G03B 21/147; G03B 21/208; G03B 21/2066; G02B 19/0047; G02B 19/0014; H04N 9/3152
See application file for complete search history.

(56) References Cited

U.S. PATENT DOCUMENTS

| | | |
|---|---|---|
| 8,721,086 B2 | 5/2014 | Chang et al. |
| 2003/0234983 A1 | 12/2003 | Baba |
| 2004/0156130 A1* | 8/2004 | Powell ................. G02B 3/0025 359/845 |

(Continued)

FOREIGN PATENT DOCUMENTS

| | | |
|---|---|---|
| TW | I418916 B | 12/2013 |
| TW | I484282 B | 5/2015 |

OTHER PUBLICATIONS

Corresponding European search report dated Aug. 5, 2019.
Corresponding Taiwan office action dated Mar. 19, 2020.
Corresponding Taiwan office action dated Dec. 27, 2019.

*Primary Examiner* — Michelle M Iacoletti
*Assistant Examiner* — Danell L Owens
(74) *Attorney, Agent, or Firm* — CKC & Partners Co., LLC (57) ABSTRACT

A projection apparatus includes a light source, a light reflective member, a light valve, and a light beam adjusting member. The light source is configured to provide an illumination beam. The light reflective member is configured to reflect the illumination beam. The light valve is configured to convert the illumination beam reflected by the light reflective member into an image beam. The light beam adjusting member is optically coupled between the light source and the light reflective member and includes a collimating lens module. The collimating lens module has a light entering surface and a light leaving surface respectively at opposite sides thereof. The light entering surface and the light leaving surface respectively have a first optical axis and a second optical axis extending along different directions.

20 Claims, 7 Drawing Sheets

(56) References Cited

U.S. PATENT DOCUMENTS

| | | | |
|---|---|---|---|
| 2007/0008494 A1* | 1/2007 | Kimura | G02B 27/285 353/20 |
| 2012/0092626 A1 | 4/2012 | Chang et al. | |
| 2012/0113395 A1* | 5/2012 | Chang | G03B 21/2066 353/31 |
| 2012/0162613 A1 | 6/2012 | Liu et al. | |
| 2012/0249971 A1 | 10/2012 | Chen et al. | |

* cited by examiner

IMAGE PROJECTION APPARATUS

CROSS-REFERENCE TO RELATED APPLICATION

This application claims priority to U.S. Provisional Application Ser. No. 62/648,934, filed on Mar. 28, 2018, which is herein incorporated by reference.

BACKGROUND

Technical Field

The present disclosure relates to a projection apparatus.

Description of Related Art

When a projection apparatus performs image projection, the light valve thereof usually converts an illumination beam into an image beam and reflects the image beam to a projection lens. The image beam is then projected by the projection lens onto a screen to form images.

When designing an optical engine with a DLP architecture, it is difficult to achieve good quality of light efficiency and uniformity. A projection apparatus of some conventional designs may use a TIR prism, a RTIR prism, or multiple mirrors as a light conversion component to achieve high efficiency and low illumination crosstalk, but the size of the projection apparatus may not be easily reduced and the image provided by the projection apparatus may have a small viewing angle (e.g., about 40 degrees).

A projection apparatus of another conventional design uses a field lens as a light conversion component, which allows the projection apparatus to have a smaller volume and a larger viewing angle. However, the projection apparatus of this design may have a poor optical efficiency and a relatively high crosstalk, which will result in a significant reduction in the quality of the projected image.

Accordingly, it is an important issue for the industry to provide a projection apparatus capable of solving the aforementioned problems.

SUMMARY

An aspect of the disclosure is to provide a projection apparatus that can efficiently solve the aforementioned problems.

According to an embodiment of the disclosure, a projection apparatus includes a light source, a light reflective member, a light valve, and a light beam adjusting member. The light source is configured to provide an illumination beam. The light reflective member is configured to reflect the illumination beam. The light valve is configured to convert the illumination beam reflected by the light reflective member into an image beam. The light beam adjusting member is optically coupled between the light source and the light reflective member and includes a collimating lens module. The collimating lens module has a light entering surface and a light leaving surface respectively at opposite sides thereof. The light entering surface and the light leaving surface respectively have a first optical axis and a second optical axis extending along different directions.

In an embodiment of the disclosure, the light beam adjusting member further includes a light homogenizing module. The light homogenizing module is between the light source and the collimating lens module and has a third optical axis. An angle between the first optical axis and the third optical axis is different from an angle between the second optical axis and the third optical axis.

In an embodiment of the disclosure, the light homogenizing module is a light integrator.

In an embodiment of the disclosure, the light integrator includes a plurality of microlenses attached to each other and arranged in an array.

In an embodiment of the disclosure, the third optical axis passes through a centroid of the microlenses.

In an embodiment of the disclosure, the third optical axis passes through one of the microlenses.

In an embodiment of the disclosure, light homogenizing module includes a one-piece microlens array.

In an embodiment of the disclosure, the collimating lens module is a unitary lens structure.

In an embodiment of the disclosure, the collimating lens module includes two sub lenses sequentially arranged between the light source and the light reflective member. The light entering surface and the light leaving surface are respectively on the two sub lenses.

In an embodiment of the disclosure, the two sub lenses are attached to each other.

In an embodiment of the disclosure, the two sub lenses are spaced apart from each other.

In an embodiment of the disclosure, the projection apparatus further includes a projection lens. The projection lens is configured to receive the image beam.

In an embodiment of the disclosure, the projection apparatus further includes a field lens. The field lens is optically coupled between the light reflective member and the light valve and between the light valve and the projection lens.

In an embodiment of the disclosure, the projection apparatus further includes a field lens between the light reflective member and the light valve. The illumination beam is reflected to the light valve through the field lens. The image beam propagates through the field lens.

In an embodiment of the disclosure, the light entering surface is a portion of the collimating lens module facing toward and closest to the light source.

In an embodiment of the disclosure, the light leaving surface is a portion of the collimating lens module facing toward and closest to the light reflective member.

In an embodiment of the disclosure, the first optical axis passes through a center of the light entering surface.

In an embodiment of the disclosure, the first optical axis is perpendicular to the light entering surface.

In an embodiment of the disclosure, the second optical axis passes through a center of the light leaving surface.

In an embodiment of the disclosure, the second optical axis is perpendicular to the light leaving surface.

Accordingly, in the projection apparatus of the present disclosure, the collimating lens module of the light beam adjusting member has a splitting optical axis (i.e., a discontinuous optical axis). Specifically, the light entering surface and the light leaving surface of the collimating lens module respectively have two optical axes extending along different directions. In addition, the light homogenizing module of the light beam adjusting member has an optical axis, and an angle between the optical axes of the light entering surface and the light homogenizing module is different from an angle between the light leaving surface and the light homogenizing module. As such, a high optical efficiency and a relatively low crosstalk can be achieved by the projection apparatus of the present disclosure, as well as a high image quality can be obtained.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1:
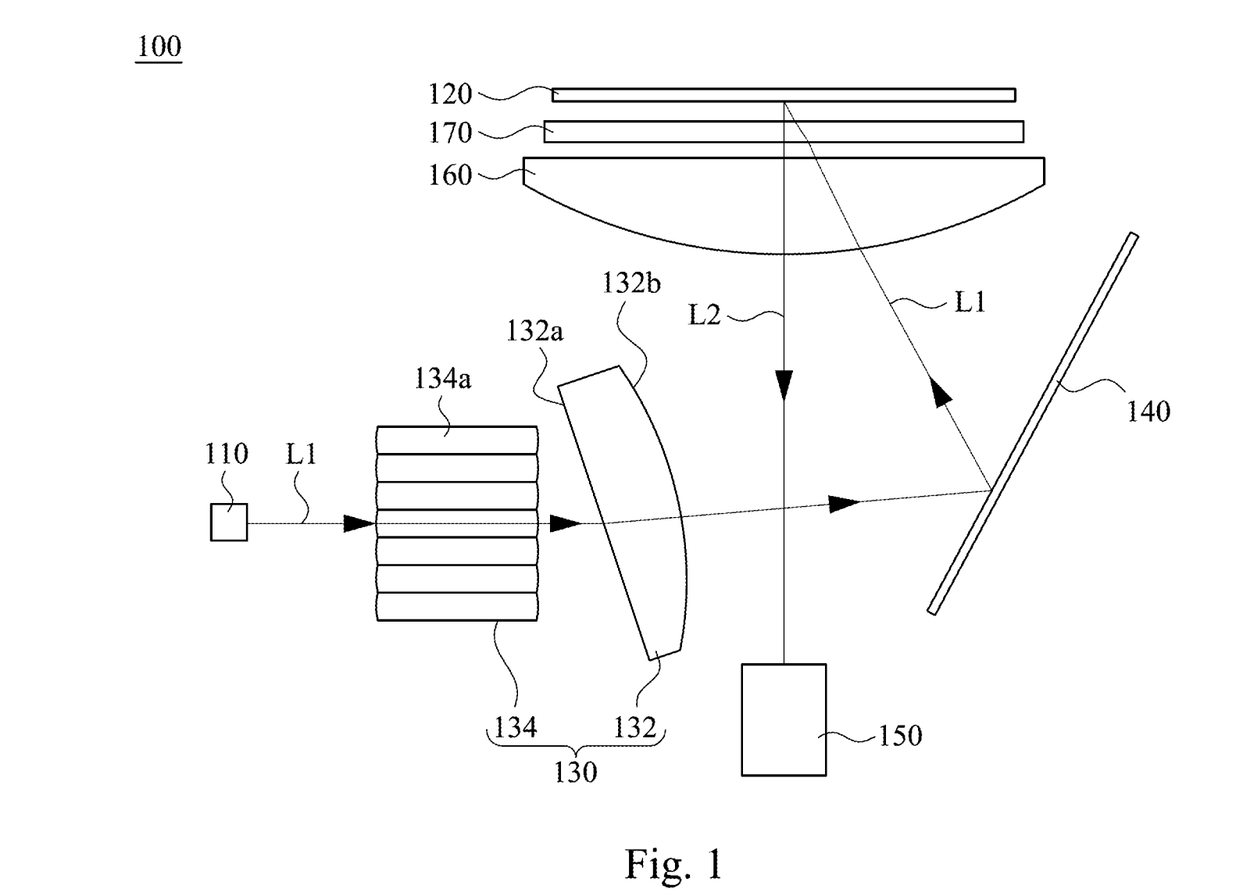
FIG. 1 is a schematic diagram of a projection apparatus according to some embodiments of the present disclosure.

Reference is made to FIG. 1. FIG. 1 is a schematic diagram of a projection apparatus 100 according to some embodiments of the present disclosure. As shown in FIG. 1, the projection apparatus 100 includes a light source 110, a light valve 120, a light beam adjusting member 130, and a light reflective member 140. The light source 110 is configured to provide an illumination beam L1 which is depicted in the form of ray in FIG. 1 for simplicity. In some embodiments, the light source 110 may include at least one light emitting diode (LED), an ultra-high pressure lamp (UHP lamp), or the like.

The light reflective member 140 is configured to reflect the illumination beam L1 propagating from the light source 110. In some embodiments, the light reflective member 140 is, for example, a reflective mirror, but the disclosure is not limited in this regard. The light valve 120 is configured to convert the illumination beam L1 reflected by the light reflective member 140 into an image beam L2 which is depicted in the form of ray in FIG. 1 for simplicity.

The light beam adjusting member 130 is optically coupled between the light source 110 and the light reflective member 140. That is, the illumination beam L1 propagates from the light source 110 to the light reflective member 140 via the light beam adjusting member 130. The light beam adjusting member 130 includes a collimating lens module 132 and a light homogenizing module 134. The light homogenizing module 134 is between the light source 110 and the collimating lens module 132. The light homogenizing module 134 is configured to homogenize the illumination beam L1 passing through the light homogenizing module 134 and adjust the light radiation pattern of the illumination beam L1 passing through the light homogenizing module 134. For example, if an active surface (at which the illumination beam L1 is converted into the image beam L2) of the light valve 120 has a rectangular shape, it is preferred that the light radiation pattern of the illumination beam L1 transmitted to the light valve 120 is a rectangular shape as well. The method to adjust the light radiation pattern of the illumination beam L1 may be implemented by means of the light homogenizing module 134.

The collimating lens module 132 is between the light homogenizing module 134 and the light reflective member 140. The collimating lens module 132 is configured to narrow the illumination beam L1 propagating from the light homogenizing module 134. The "narrow" may mean either to cause the rays of the illumination beam L1 to become more aligned in a specific direction, or to cause the spatial cross section of the illumination beam L1 to become smaller.

As shown in FIG. 1, the projection apparatus 100 further includes a projection lens 150. The projection lens 150 is configured to receive the image beam L2. Furthermore, the projection apparatus 100 further includes a field lens 160. The field lens 160 is optically coupled between the light reflective member 140 and the light valve 120 and between the light valve 120 and the projection lens 150. That is, the field lens 160 is on the propagating paths of the illumination beam L1 and the image beam L2. In more details, the illumination beam L1 is reflected to the light valve 120 through the field lens 160, and the image beam L2 propagates from the light valve 120 to the projection lens 150 through the field lens 160. The field lens 160 is configured to converge the image beam L2 and transmit the image beam L2 to the projection lens 150. In some embodiments, as shown in FIG. 1, the projection apparatus 100 may further include a protection cap 170 between the light valve 120 and the field lens 160 and in front of the light valve 120 for protecting the light valve 120.

In some embodiments, the light valve 120 is, for example, a digital micro-mirror device (DMD) having on its active surface several hundred thousand microscopic mirrors arranged in a rectangular array which correspond to the pixels in the image to be displayed. The mirrors can be individually rotated to an on or off state. In the on state, the illumination beam L1 reflected by the light reflective member 140 is reflected by the mirrors to form the image beam L2 which propagates to the projection lens 150 making the pixels appear bright on the screen. In the off state, the illumination beam L1 reflected by the light reflective member 140 is directed elsewhere by the mirrors, making the pixels appear dark.

Figure 2:
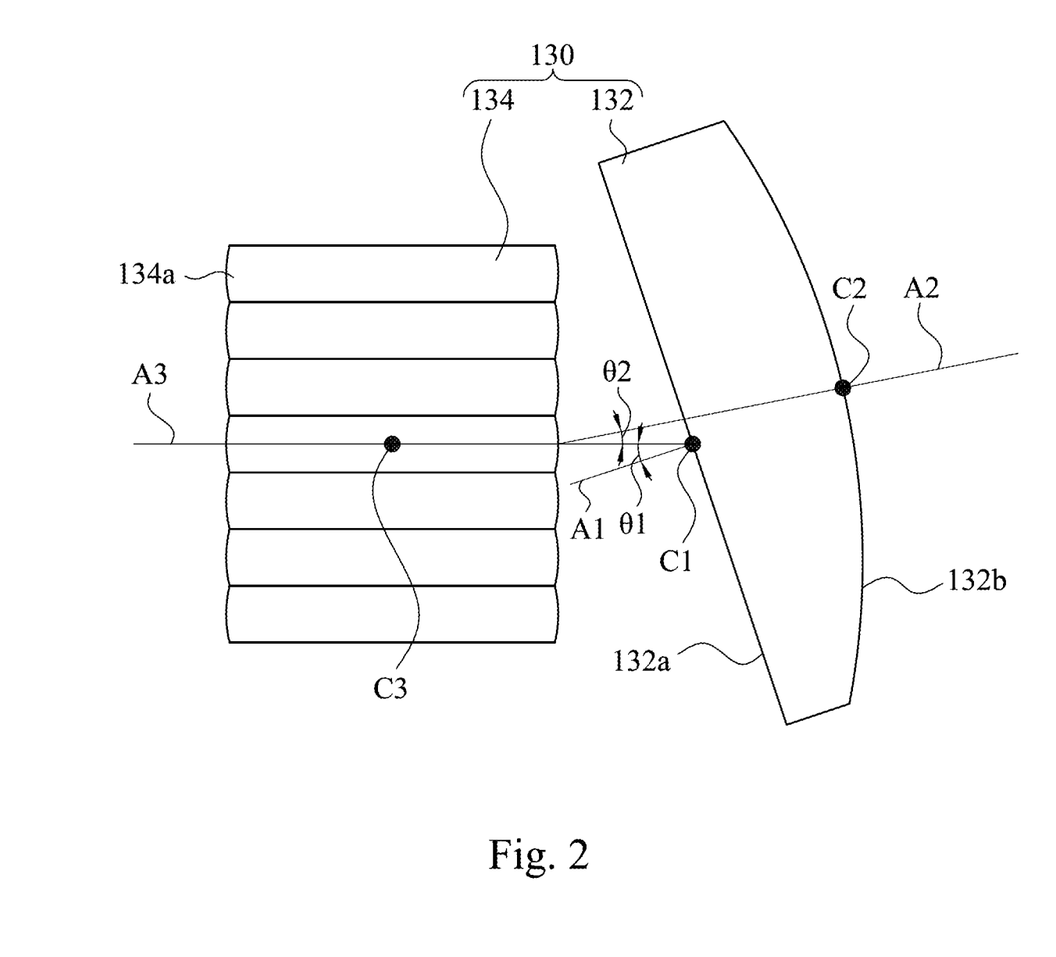
FIG. 2 is an enlarged diagram of the light beam adjusting member shown in FIG. 1.

Reference is made to FIG. 2. FIG. 2 is an enlarged diagram of the light beam adjusting member 130 shown in FIG. 1. The collimating lens module 132 has a light entering surface 132a and a light leaving surface 132b respectively at opposite sides thereof. The light entering surface 132a is a portion of the collimating lens module 132 facing toward and closest to the light source 110. The light leaving surface 132b is a portion of the collimating lens module 132 facing toward and closest to the light reflective member 140. The light entering surface 132a and the light leaving surface 132b respectively have a first optical axis A1 and a second optical axis A2 extending along different directions. Specifically, the first optical axis A1 passes through a center C1 of the light entering surface 132a and is perpendicular to the light entering surface 132a. The second optical axis A2 passes through a center C2 of the light leaving surface 132b and is perpendicular to the light leaving surface 132b. In other words, the collimating lens module 132 has a splitting optical axis (i.e., a discontinuous optical axis). In some embodiments, the center C1 of the light entering surface 132a refers to the centroid of the light entering surface 132a. In some embodiments, the center C2 of the light leaving surface 132b refers to the centroid of the light leaving surface 132b. On the other hand, the light homogenizing module 134 has a third optical axis A3. Specifically, an angle θ1 between the first optical axis A1 and the third optical axis A3 is different from an angle θ2 between the second optical axis A2 and the third optical axis A3.

With the foregoing optical configurations, a high optical efficiency and a relatively low crosstalk can be achieved by the projection apparatus 100, as well as a high image quality can be obtained. Specifically, by adopting the light beam adjusting member 130 with the splitting optical axis in the projection apparatus 100, a solid angle of the illumination beam L1 incident to the light valve 120 can be well controlled. For example, chief ray angles of the illumination beam L1 incident to the light valve 120 may be controlled to be less than 3 degrees.

In practice, some design parameters of the collimating lens module 132 (e.g., the angle θ1, the angle θ2, the shape of the light entering surface 132a, the shape of the light leaving surface 132b, etc.) can be adjusted by the assistance of an optical simulation software, so as to better control the solid angle of the illumination beam L1 incident to the light valve 120.

Figure 3:
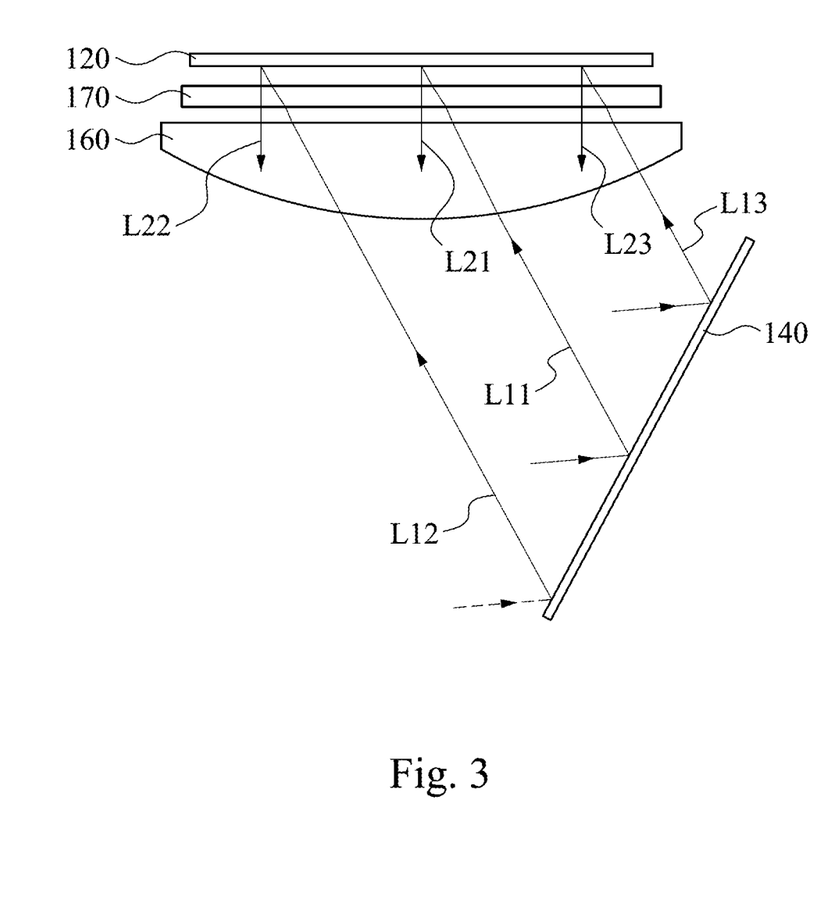
FIG. 3 is a schematic diagram illustrating some components of the projection apparatus and rays of the illumination beam and the image beam propagating thereamong.

Reference is made to FIG. 3. FIG. 3 is a schematic diagram illustrating some components of the projection apparatus 100 and rays of the illumination beam L1 and the image beam L2 propagating thereamong. As shown in FIG. 3, owing to the chief ray angles of the illumination beam L1 can be well controlled, rays (e.g., a central ray L11 and peripheral rays L12, L13) of the illumination beam L1 may reach the active surface of the light valve 120 with a substantially identical incident angle, such that rays (e.g., a central ray L21 and peripheral rays L22, L23) of the image beam L2 leaving the light valve 120 may be substantially parallel to each other. In some embodiments, the rays of the image beam L2 leaving the light valve 120 may be substantially perpendicular to the active surface of the light valve 120. As such, the image beam L2 may completely enter the projection lens 150 more easily, and thus the loss of optical efficiency of the projection apparatus 100 can be effectively reduced. On the contrary, in a conventional projection apparatus adopting a light beam adjusting member having a single optical axis (i.e., without splitting), there is no way for rays of the illumination beam to reach the light valve with a predetermined incident angle, which results in unevenness of the illumination beam and in turn reduces the optical efficiency (e.g., about 20% or more).

Furthermore, the light beam adjusting member 130 with the splitting optical axis in the projection apparatus 100 can also uniformize the aberration caused by the field lens 160 on the propagating path of the illumination beam L1, so that the generation of crosstalk can be reduced and the illumination beam L1 incident on the light valve 120 may be more uniform (i.e., spot sizes of the illumination beam L1 is more uniform). On the contrary, the conventional light beam adjusting member having the single optical axis may cause the distortion of illumination area when the illumination beam incident onto the light valve.

In some embodiments, as shown in FIGS. 1 and 2, the collimating lens module 132 is a unitary lens structure. On the other hand, the light homogenizing module 134 is a light integrator. The light integrator includes a plurality of microlenses 134a attached to each other and arranged in an array (e.g., a rectangular array). The third optical axis A3 passes through a centroid C3 of the microlenses 134a, in which the centroid C3 is on one of the microlenses 134a. In some other embodiments, the centroid C3 may be spaced apart from the microlenses 134a.

Figure 4:
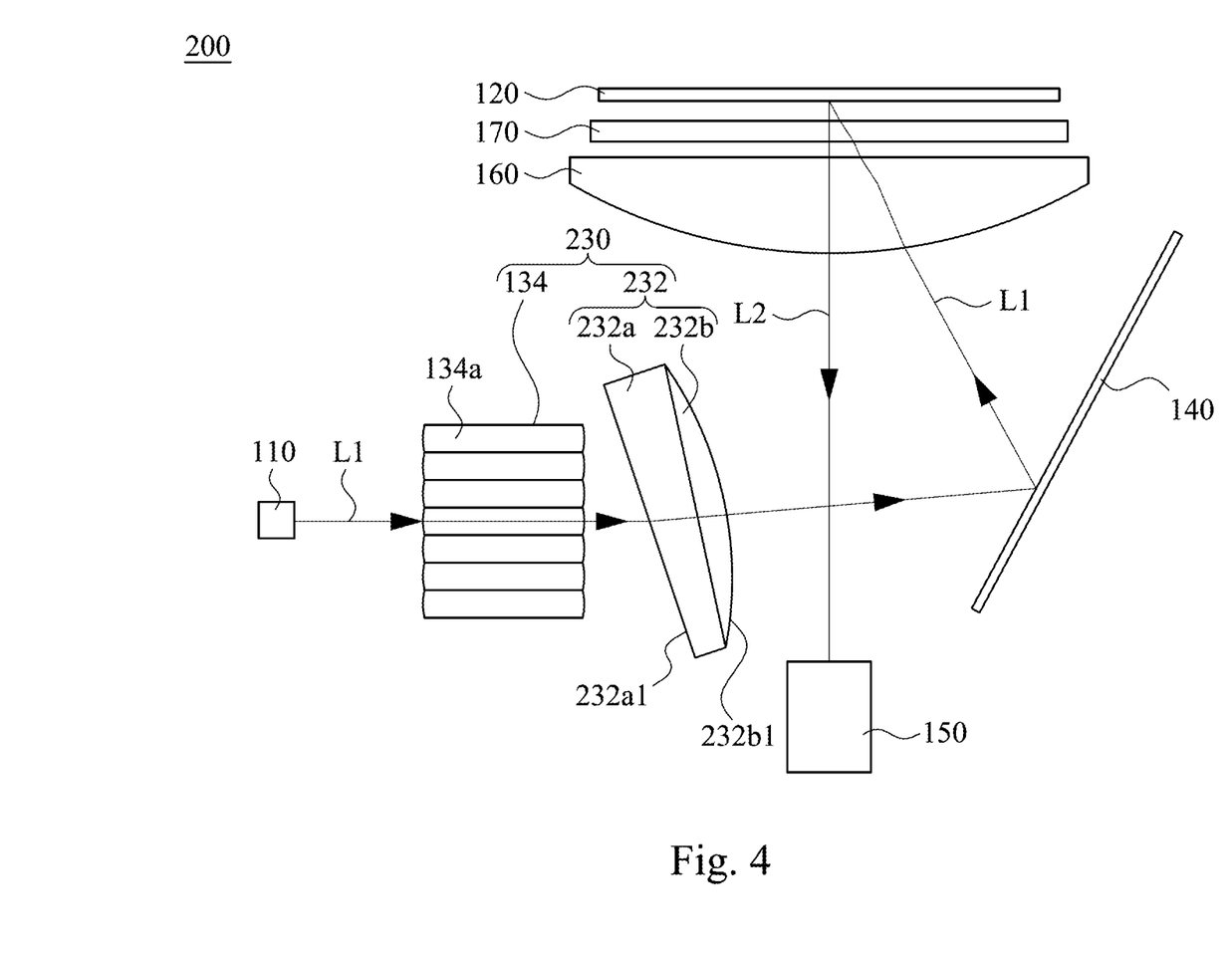
FIG. 4 is a schematic diagram of a projection apparatus according to some embodiments of the present disclosure.

Reference is made to FIG. 4. FIG. 4 is a schematic diagram of a projection apparatus 200 according to some embodiments of the present disclosure. As shown in FIG. 4, in some embodiments, the projection apparatus 200 includes a light source 110, a light valve 120, a light beam adjusting member 230, a light reflective member 140, a projection lens 150, a field lens 160, and a protection cap 170, in which the light beam adjusting member 230 includes a collimating lens module 232 and a light homogenizing module 134. The light source 110, the light valve 120, the light homogenizing module 134, the light reflective member 140, the projection lens 150, the field lens 160, and the protection cap 170 are identical or similar to those of the embodiments as illustrated by FIG. 1, therefore descriptions of these components are the same and would not be repeated here for simplicity. Compared to the embodiments as illustrated by FIG. 1, the collimating lens module 232 of the light beam adjusting member 230 includes two sub lenses 232a, 232b attached to each other and sequentially arranged between the light source 110 and the light reflective member 140. The two sub lenses 232a, 232b respectively have a light entering surface 232a1 and a light leaving surface 232b1. The light entering surface 232a1 is a portion of the collimating lens module 232 facing toward and closest to the light source 110. The light leaving surface 232b1 is a portion of the collimating lens module 232 facing toward and closest to the light reflective member 140. Relationships among optical axes of the light entering surface 232a1, the light leaving surface 232b1, and the light homogenizing module 134 are identical or similar to those of the embodiments as illustrated by FIG. 1, therefore descriptions of these components are the same and would not be repeated here for simplicity. In some embodiments, the number of the sub lenses included by the collimating lens module 232 may be more than two.

Figure 5:
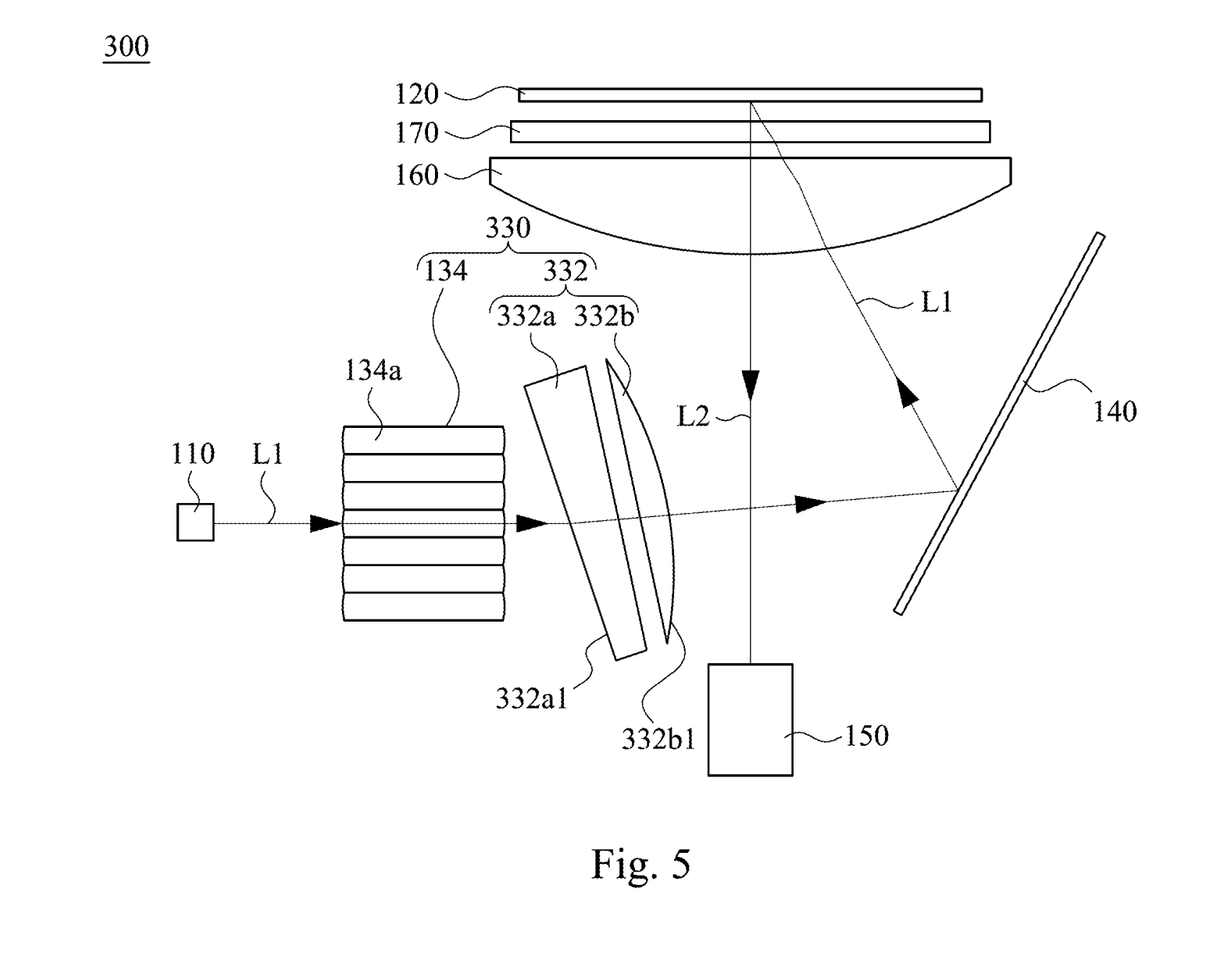
FIG. 5 is a schematic diagram of a projection apparatus according to some embodiments of the present disclosure.

Reference is made to FIG. 5. FIG. 5 is a schematic diagram of a projection apparatus 300 according to some embodiments of the present disclosure. As shown in FIG. 5, in some embodiments, the projection apparatus 300 includes a light source 110, a light valve 120, a light beam adjusting member 330, a light reflective member 140, a projection lens 150, a field lens 160, and a protection cap 170, in which the light beam adjusting member 330 includes a collimating lens module 332 and a light homogenizing module 134. The light source 110, the light valve 120, the light homogenizing module 134, the light reflective member 140, the projection lens 150, the field lens 160, and the protection cap 170 are identical or similar to those of the embodiments as illustrated by FIG. 4, therefore descriptions of these components are the same and would not be repeated here for simplicity. Compared to the embodiments as illustrated by FIG. 4, the collimating lens module 332 of the light beam adjusting member 330 also includes two sub lenses 332a, 332b, but the two sub lenses 332a, 332b spaced apart from each other. The two sub lenses 332a, 332b respectively have a light entering surface 332a1 and a light leaving surface 332b1. The light entering surface 332a1 is a portion of the collimating lens module 332 facing toward and closest to the light source 110. The light leaving surface 332b1 is a portion of the collimating lens module 332 facing toward and closest to the light reflective member 140. Relationships among optical axes of the light entering surface 332a1, the light leaving surface 332b1, and the light homogenizing module 134 are identical or similar to those of the embodiments as illustrated by FIG. 1, therefore descriptions of these components are the same and would not be repeated here for simplicity. In some embodiments, the collimating lens module 332 may include one or more additional sub lenses between the sub lenses 332a, 332b.

Figure 6:
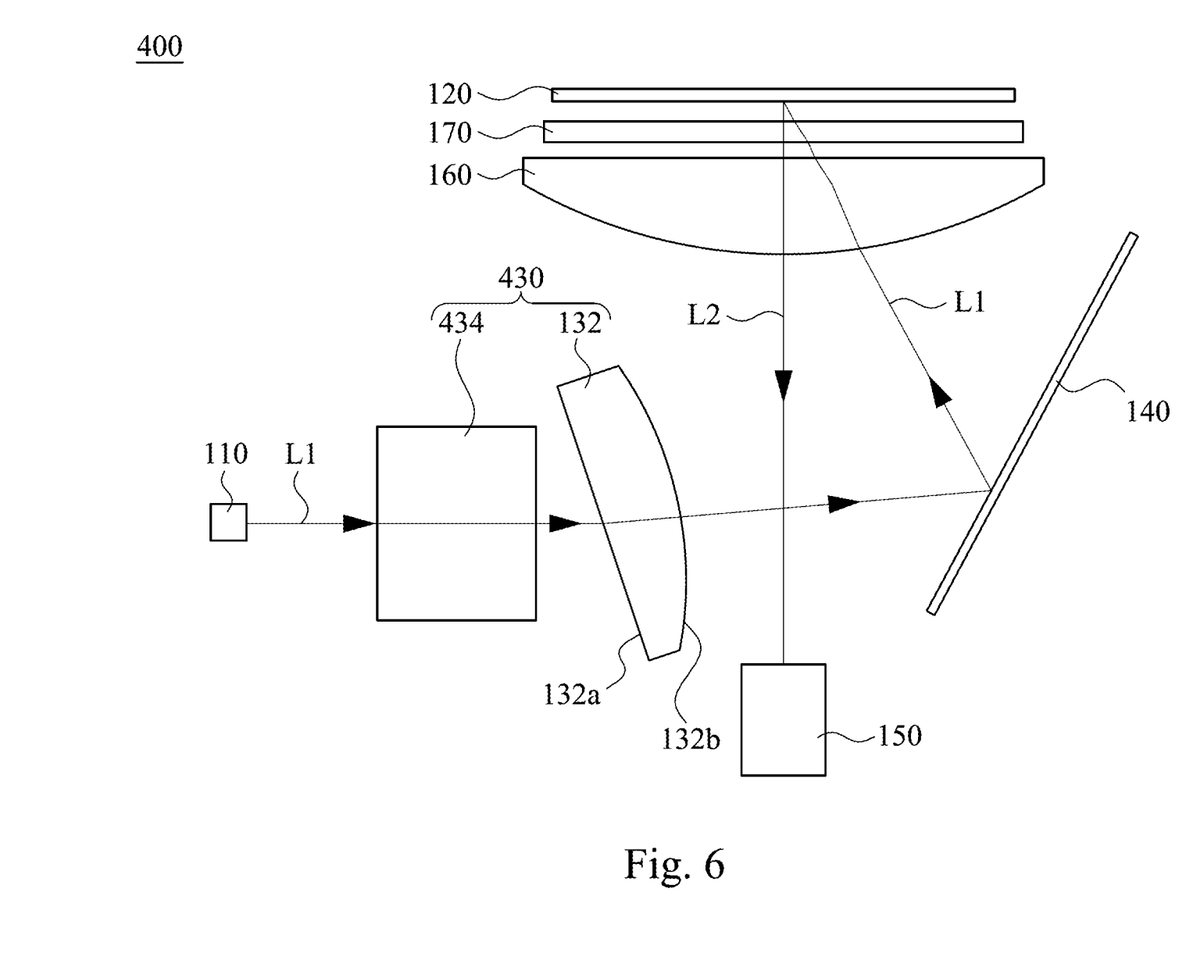
FIG. 6 is a schematic diagram of a projection apparatus according to some embodiments of the present disclosure.

Reference is made to FIG. 6. FIG. 6 is a schematic diagram of a projection apparatus 400 according to some embodiments of the present disclosure. As shown in FIG. 6, in some embodiments, the projection apparatus 400 includes a light source 110, a light valve 120, a light beam adjusting member 430, a light reflective member 140, a projection lens 150, a field lens 160, and a protection cap 170, in which the light beam adjusting member 430 includes a collimating lens module 132 and a light homogenizing module 434. The light source 110, the light valve 120, the collimating lens module 132, the light reflective member 140, the projection lens 150, the field lens 160, and the protection cap 170 are identical or similar to those of the embodiments as illustrated by FIG. 1, therefore descriptions of these components are the same and would not be repeated here for simplicity. Compared to the embodiments as illustrated by FIG. 1, the light homogenizing module 434 is a light integrator, and the light integrator is a unitary lens structure. The light homogenizing module 434 is also configured to homogenize the illumination beam L1 passing through the light homogenizing module 434 and adjust the light radiation pattern of the illumination beam L1 passing through the light homogenizing module 434.

Figure 7:
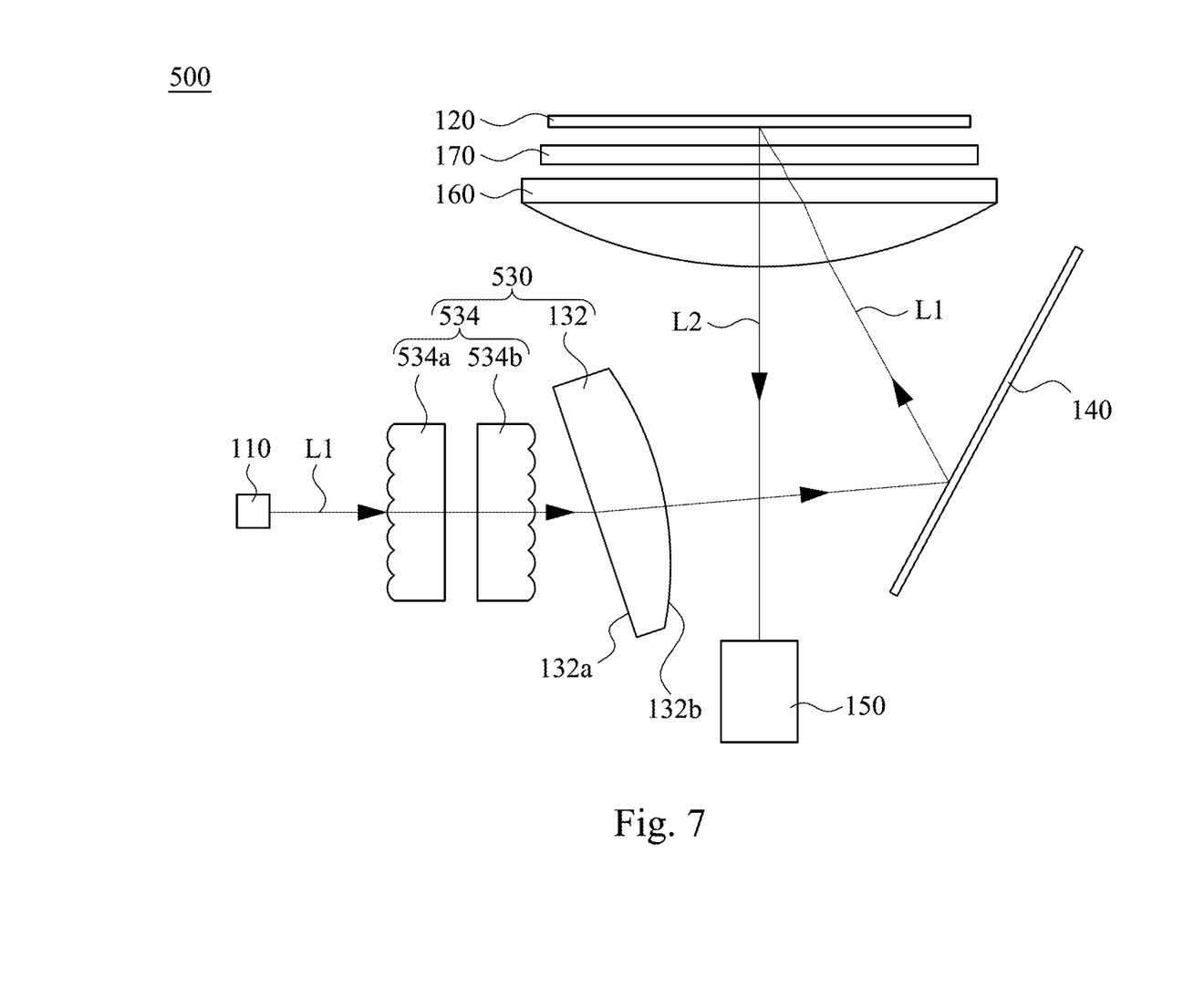
FIG. 7 is a schematic diagram of a projection apparatus according to some embodiments of the present disclosure.

Reference is made to FIG. 7. FIG. 7 is a schematic diagram of a projection apparatus 500 according to some embodiments of the present disclosure. As shown in FIG. 7, in some embodiments, the projection apparatus 500 includes a light source 110, a light valve 120, a light beam adjusting member 530, a light reflective member 140, a projection lens 150, a field lens 160, and a protection cap 170, in which the light beam adjusting member 530 includes a collimating lens module 132 and a light homogenizing module 534. The light source 110, the light valve 120, the collimating lens module 132, the light reflective member 140, the projection lens 150, the field lens 160, and the protection cap 170 are identical or similar to those of the embodiments as illustrated by FIG. 1, therefore descriptions of these components are the same and would not be repeated here for simplicity. Compared to the embodiments as illustrated by FIG. 1, the light homogenizing module 534 includes two microlens arrays 534a, 534b. Each of the microlens arrays 534a, 534b is a one-piece structure. The two microlens arrays 534a, 534b are sequentially arranged between the light source 110 and the collimating lens module 132. The light homogenizing module 534 is also configured to homogenize the illumination beam L1 passing through the light homogenizing module 534 and adjust the light radiation pattern of the illumination beam L1 passing through the light homogenizing module 534.

According to the foregoing recitations of the embodiments of the disclosure, it can be seen that in the projection apparatus of the present disclosure, the collimating lens module of the light beam adjusting member has a splitting optical axis (i.e., a discontinuous optical axis). Specifically, the light entering surface and the light leaving surface of the collimating lens module respectively have two optical axes extending along different directions. In addition, the light homogenizing module of the light beam adjusting member has an optical axis, and an angle between the optical axes of the light entering surface and the light homogenizing module is different from an angle between the light leaving surface and the light homogenizing module. As such, a high optical efficiency and a relatively low crosstalk can be achieved by the projection apparatus of the present disclosure, as well as a high image quality can be obtained.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A projection apparatus, comprising:
    a light source configured to provide an illumination beam;
    a light reflective member configured to reflect the illumination beam;
    a light valve configured to convert the illumination beam reflected by the light reflective member into an image beam; and
    a light beam adjusting member optically coupled between the light source and the light reflective member and comprising a collimating lens module, the collimating lens module having a light entering surface and a light leaving surface respectively at opposite sides thereof, wherein the light entering surface and the light leaving surface respectively have a first optical axis and a second optical axis extending along different directions.

2. The projection apparatus of claim 1, wherein the light beam adjusting member further comprises:
    a light homogenizing module between the light source and the collimating lens module and having a third optical axis, wherein an angle between the first optical axis and the third optical axis is different from an angle between the second optical axis and the third optical axis.

3. The projection apparatus of claim 2, wherein the light homogenizing module is a light integrator.

4. The projection apparatus of claim 3, wherein the light integrator comprises a plurality of microlenses attached to each other and arranged in an array.

5. The projection apparatus of claim 4, wherein the third optical axis passes through a centroid of the microlenses.

6. The projection apparatus of claim 4, wherein the third optical axis passes through one of the microlenses.

7. The projection apparatus of claim 2, wherein the light homogenizing module comprises a one-piece microlens array.

8. The projection apparatus of claim 1, wherein the collimating lens module is a unitary lens structure.

9. The projection apparatus of claim 1, wherein the collimating lens module comprises two sub lenses sequentially arranged between the light source and the light reflective member, and the light entering surface and the light leaving surface are respectively on the two sub lenses.

10. The projection apparatus of claim 9, wherein the two sub lenses are attached to each other.

11. The projection apparatus of claim 9, wherein the two sub lenses are spaced apart from each other.

12. The projection apparatus of claim 1, further comprising a projection lens configured to receive the image beam.

13. The projection apparatus of claim 12, further comprising a field lens optically coupled between the light reflective member and the light valve and between the light valve and the projection lens.

14. The projection apparatus of claim 1, further comprising a field lens between the light reflective member and the light valve, wherein the illumination beam is reflected to the light valve through the field lens, and the image beam propagates through the field lens.

15. The projection apparatus of claim 1, wherein the light entering surface is a portion of the collimating lens module facing toward and closest to the light source.

16. The projection apparatus of claim 1, wherein the light leaving surface is a portion of the collimating lens module facing toward and closest to the light reflective member.

17. The projection apparatus of claim 1, wherein the first optical axis passes through a center of the light entering surface.

18. The projection apparatus of claim 1, wherein the first optical axis is perpendicular to the light entering surface.

19. The projection apparatus of claim 1, wherein the second optical axis passes through a center of the light leaving surface.

20. The projection apparatus of claim 1, wherein the second optical axis is perpendicular to the light leaving surface.

* * * * *